(12) United States Patent
Piepenbrink et al.

(10) Patent No.: US 8,776,185 B2
(45) Date of Patent: Jul. 8, 2014

(54) INTEGRATED SERVICE IDENTITY FOR DIFFERENT TYPES OF INFORMATION EXCHANGE SERVICES

(75) Inventors: David J. Piepenbrink, Chicago, IL (US); Lee M. Chow, Naperville, IL (US); James T. Sofos, Aurora, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 773 days.

(21) Appl. No.: 12/341,425

(22) Filed: Dec. 22, 2008

(65) Prior Publication Data
US 2010/0162363 A1    Jun. 24, 2010

(51) Int. Cl.
H04L 29/06    (2006.01)

(52) U.S. Cl.
USPC ..................... 726/4; 726/5; 726/27

(58) Field of Classification Search
USPC ............... 713/150–181; 726/27, 1–21
See application file for complete search history.

(56) References Cited

U.S. PATENT DOCUMENTS

| | | | |
|---|---|---|---|
| 6,628,670 B1 | 9/2003 | Galand et al. | |
| 6,643,262 B1 | 11/2003 | Larsson et al. | |
| 6,922,399 B1 | 7/2005 | Dirkmann et al. | |
| 7,206,318 B2 | 4/2007 | Keller | |
| 7,383,339 B1* | 6/2008 | Meenan et al. | 709/227 |
| 7,428,585 B1* | 9/2008 | Owens et al. | 709/223 |
| 7,450,927 B1* | 11/2008 | Creswell et al. | 455/405 |
| 7,720,960 B2 | 5/2010 | Pruss et al. | |
| 2001/0016830 A1 | 8/2001 | Globuschutz | |
| 2001/0056389 A1 | 12/2001 | Fair et al. | |
| 2002/0033416 A1 | 3/2002 | Gerszberg et al. | |
| 2003/0061067 A1* | 3/2003 | Atwal et al. | 705/1 |
| 2003/0220872 A1* | 11/2003 | Chandrashekhar et al. | 705/40 |
| 2005/0091411 A1* | 4/2005 | Michaiel et al. | 709/249 |
| 2005/0114437 A1* | 5/2005 | Creamer et al. | 709/203 |
| 2005/0240558 A1* | 10/2005 | Gil et al. | 707/1 |
| 2007/0120970 A1* | 5/2007 | Goffin | 348/14.16 |
| 2007/0157249 A1* | 7/2007 | Cordray et al. | 725/58 |

OTHER PUBLICATIONS

Single Password, Multiple Accounts (Sep. 6, 2005) by Mohamed G. Gouda, Alex X. Liu, Lok M. Leung, and Mohamed A. Alam; 12 pages; originally downloaded from http://www.cs.utexas.edu/~gouda/papers/conference/password.pdf.*
"Comcast Triple Play Review from Subscriber (Cable, Internet, & Phone)" (Dec. 21, 2007) by Mike; converted to PDF originally from http://www.epinions.com/review/elec_Services_Cable_By_Provider-Comcast/content_411546783364.*

(Continued)

*Primary Examiner* — Chau Le
*Assistant Examiner* — Don Zhao
(74) *Attorney, Agent, or Firm* — Jackson Walker L.L.P.

(57) ABSTRACT

A service provisioning method includes providing a differentiated set of information exchange services to a user. In some embodiments, differentiation between or among the provided services may include differentiated access networks, differentiated physical network layers, and/or differentiated service providers. An integrated service identity may be generated and/or maintained by the service provider(s) or by a third party. The integrated services identity may enable the user to define preference settings applicable to the information exchange services, to process billable events and activity and to issue integrated statements encompassing all of the information exchange services provided to the user, and enabling the user to access customer support services for any of the information exchange services and further enabling the logging of all customer support activities to the integrated service identity.

19 Claims, 3 Drawing Sheets

(56) References Cited

OTHER PUBLICATIONS

"Verizon adds wireless to bundle" (Jan. 30, 2007) by Marguerite Reardon; 2 pages; converted to PDF originally from http://news.cnet.com/Verizon-adds-wireless-to-bundle/2100-1033_3-6154671.html.*

"Which Technology is Better: GSM or CDMA?" (Jun. 18, 2005) by Alessandra Carneiro; 4 pages; converted to PDF originally from http://www.hardwaresecrets.com/article/151 for page 1 of article and from http://www.hardwaresecrets.com/article/Which-Technology-is-Better-GSM-or-CDMA/151/2 for page 2 of article.*

* cited by examiner

INTEGRATED SERVICE IDENTITY FOR DIFFERENT TYPES OF INFORMATION EXCHANGE SERVICES

BACKGROUND

1. Field of the Disclosure

The present disclosure relates to information exchange services and, more particularly, managing a plurality of different types of information exchange services.

2. Description of the Related Art

Information exchanges services include wireless telephony services, multimedia content delivery services, Internet services, and fixed access voice services. Many households subscribe to two or more of these types of services. Different services may be provided by a single provider or multiple providers. Services may be provided via one or more access networks. Many households, for example, subscribe to cable television services provided via a coaxial cable-based access network and Internet and fixed access voice services via a twisted copper digital subscriber line access network.

DESCRIPTION OF EXEMPLARY EMBODIMENTS

Figure 1:
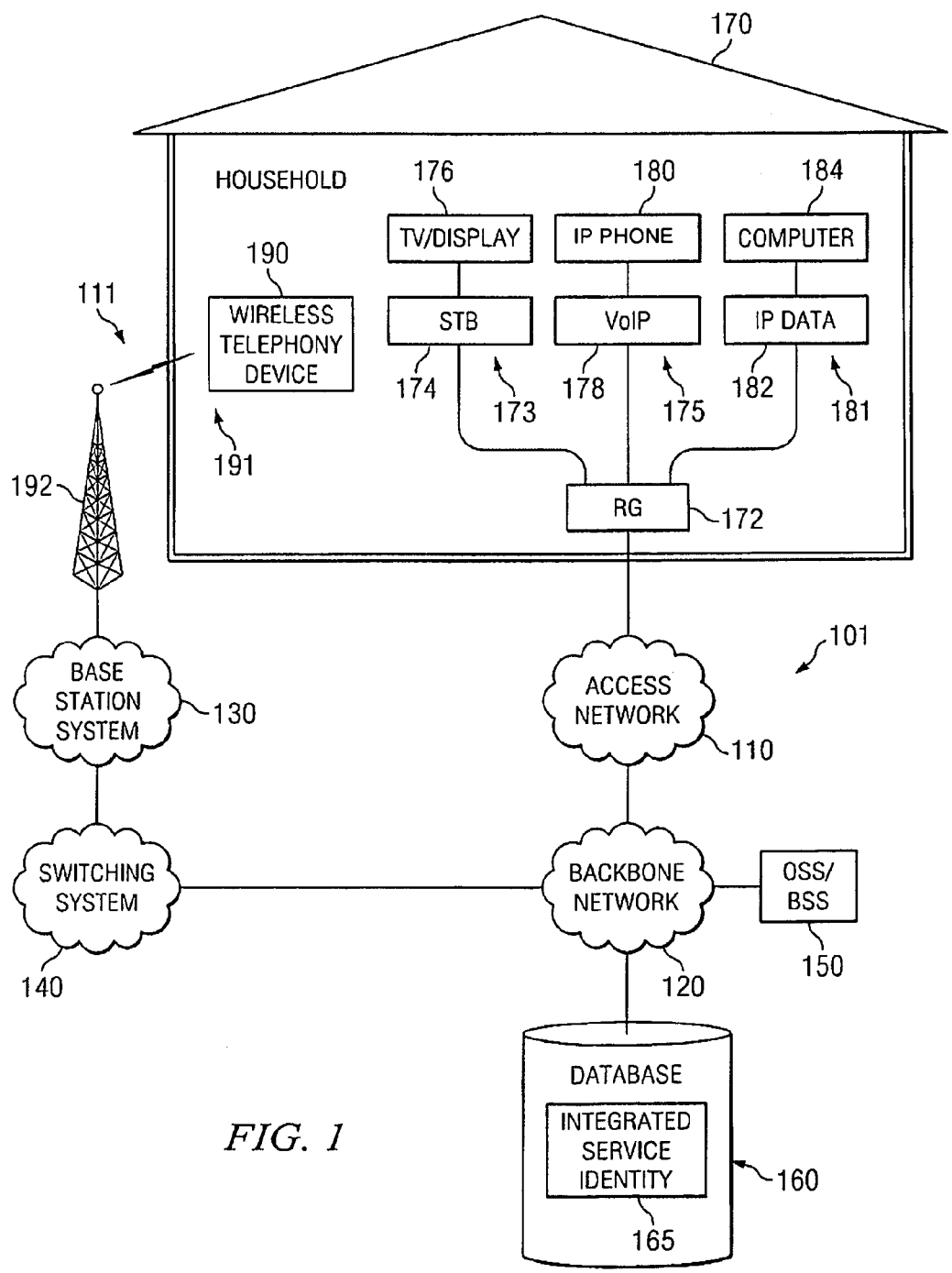
FIG. 1 is a block diagram of selected elements of an embodiment of a household emphasizing information exchange services provided to the household.

In one aspect, an embodiment of a service provisioning method disclosed herein includes providing information exchange services to a user. The information exchange services provided may include services provided via a first access network having a first physical network layer and services provided via a second access network having a second physical network layer. The information exchange services may include services provided by a first service provider and services provided by a second service provider. In these embodiments, the integrated service identity may be provided and/or maintained by a third party.

Disclosed service provisioning methods may further include defining an integrated service identity encompassing all of the information exchange services and enabling the user to use the integrated service identity (ISI) to define preference settings applicable to the information exchange services. The integrated service identity may then be employed, e.g., to process billable events and activities and to issue integrated statements encompassing all of the information exchange services provided to the user. The user may be further enabled to use the integrated service identity to access customer support services for any of the information exchange services provided and to log customer support activities to the integrated service identity.

The information exchange services provided via the first access network may include multimedia content delivery services, fixed access voice services, and broadband Internet services. The first access network may include a physical network layer including, as examples: a digital subscriber line (DSL), an integrated services digital network (ISDN), a T-carrier, or E-carrier physical network layer, a co-axial cable based physical network layer, cellular or other type of wireless physical network layer including third generation (3G) and beyond. Information exchange services provided via the second access network may include mobile telephony services. The second access network may include a physical network layer compliant with a standard such as wideband-code division multiple access (W-CDMA), time division-CDMA (TD-CDMA), TD-synchronous CDMA (TD-SCDMA) and time division multiple access (TDMA). The first access network may include a wired access network and the second access network may include a wireless access network. In some embodiments, enabling the user to define preference settings may include, e.g., enabling the user to define a single logon for all devices associated with one or more of the information exchange services. The devices associated with the information exchange services may include, as examples, a set top box/television display for rendering the multimedia content delivery services, an Internet protocol phone for the fixed access voice services, and a desktop or laptop personal computer for broadband Internet services.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning to the drawings, FIG. 1 is a block diagram depicting selected elements an embodiment of a household 170 emphasizing information exchange services consumed by household 170. FIG. 1 also depicts selected elements an embodiment of a provider network 101 for providing information exchange services to household 170. Although FIG. 1 depicts a household 170 suggesting consumer oriented services, other embodiments may encompass large or small businesses, governmental or educational entities, or any other suitable type of user that might require information exchange services.

As depicted in FIG. 1, household 170 receives various information exchange services. In the depicted embodiment, for example, household 170 receives information exchange services in the form of wireless telephony services 191 via wireless telephony device(s) 190, a multimedia content delivery service 173 via a set top box 174 and a television and/or display device 176, a fixed access voice service 175 represented by voice over Internet (VoIP) icon 178 and IP phone 180, and an Internet data service 181, represented by IP data icon 182 and computer 184.

Wireless telephony services 191 may include cellular communication services with or without wireless data services. Multimedia content delivery service 173 may include broadcast and non-broadcast television content, sometimes referred to as cable content, as well as video on demand and pay per view content. Multimedia content delivery service 173 may, for example, represent a service for delivering IPTV to household 170. Internet data services 181 may include, as examples, email services and Web access services.

In the implementation depicted in FIG. 1, information exchange services are provided to household 170 via two different access networks. Multimedia content delivery service 173, fixed access voice service 175, and Internet data service 181 are provided to household 170 via a wired access network 110 to which a residential gateway (RG) 172 is interfaced. The wireless telephony service 191, in contrast, is provided to household 170 and wireless telephony device 190 via a wireless access network 111 in the form of an air interface between wireless telephony device 190 and a cellular base station (BS) 192. In some embodiments, an integrated service identify provided as disclosed herein encompasses all of the information exchange services provided to household 170 including services provided via different access networks and/or different physical network layers or physical media. In addition, some embodiments, such as the embodiments discussed below in conjunction with FIG. 5, describe an ISI that encompasses information exchange services that are provided by two or more service providers.

As depicted in FIG. 1, all of the information exchange services are provided by a single provider network 101. The provider network 101 includes all of the resources needed to provision and distribute the applicable information exchange services to a plurality of households such as household 170 and/or other end users. The depicted embodiment of provider network 101 includes, for example, the wired access 110, base station system 130, switching system 140, and a backbone network 120. Depending upon the implementation, access network 110 may include twisted copper cables and/or fiber or another type of broadband media connected between a network node and the household. Base station system 130 and switching system 140 may include elements of a conventional wireless network such as a Global System for Mobile communications (GSM) network and/or 3G network such as Universal Mobile Telephone System (UMTS). Backbone network 120 may represent a private, high-bandwidth network maintained by the service provider to achieve low latency and high availability in terms of providing services to a plurality of households such as household 170.

provider network 101 as depicted in FIG. 1 includes a set of resources collectively identified as operation support systems/business support systems (OSS/BSS) resources 150 and a database 160 including a data structure identified as integrated service identity 165. Although DB 160 is depicted in FIG. 1 as being physically remote from OSS/BSS resources 150, DB 160 may, in other implementations, be integrated within OSS/BSS resources 150. OSS/BSS resources 150 include telecommunications network management resources including, as examples, resources for maintaining network inventory, provisioning services, configuring network components, and managing faults. In addition, OSS/BSS 150 encompasses business-oriented systems including, as examples, systems for taking orders, processing bills, and collecting payments.

Figure 2:
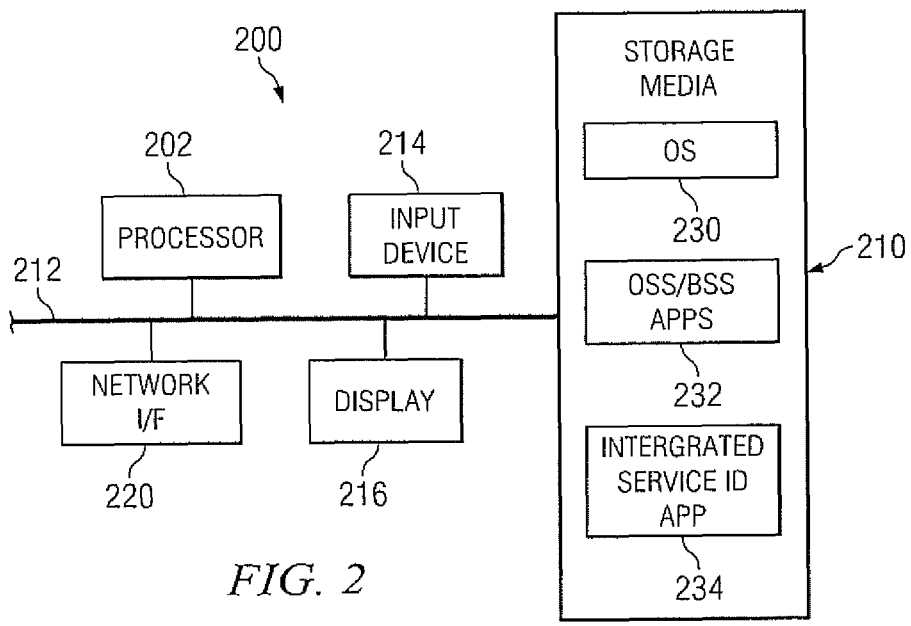
FIG. 2 is a block diagram of an embodiment of a integrated service identity suitable for use in a household such as the household of FIG. 1.

Referring to FIG. 2, selected elements of a data processing system 200 suitable for implementing OSS/BSS 150, or some portion thereof, is depicted. In the depicted embodiment, data processing system 200 includes a processor 202 and storage media 210 connected to and accessible by processor 202 via a bus 212. Data processing system 200 as depicted further includes one or more input devices such as a keyboard, pointing device or mouse, microphone, and the like represented by input device 214. Data processing system 200 as shown also includes a display 216, which may include a graphics adapter and a display screen connected thereto, and a network interface 220. Network interface 220 provides connectivity between data processing system 200, including processor 202, and an external network such as the backbone network 120 depicted in FIG. 1.

Storage media 210 may include any of various forms of computer readable storage or memory. Storage media 210 may include volatile storage elements including a system memory comprised of dynamic or static random access memory devices as well as persistent storage media such as magnetic hard disk drive units, solid state drive units, flash memory, and other types of read only memory and electrically erasable read only memory, as well as optical media including compact discs and/or digital versatile discs.

Storage media 210 may include executable instructions, i.e., computer programs, as well as data structures. In the depicted embodiment, for example, storage media 210 includes an operating system 230, which may be a Linux or other type of Unix-based operating system or a Windows-based operating system. In addition, the depicted embodiment of storage media 210 includes OSS/BSS applications 232 and an integrated service identity application 234. OSS/BSS applications 232 may include applications for provisioning services, configuring network components, and managing faults. In addition, OSS/BSS applications 232 may encompass business-oriented systems including, as examples, systems for taking orders, processing bills, and collecting payments.

Figure 3:
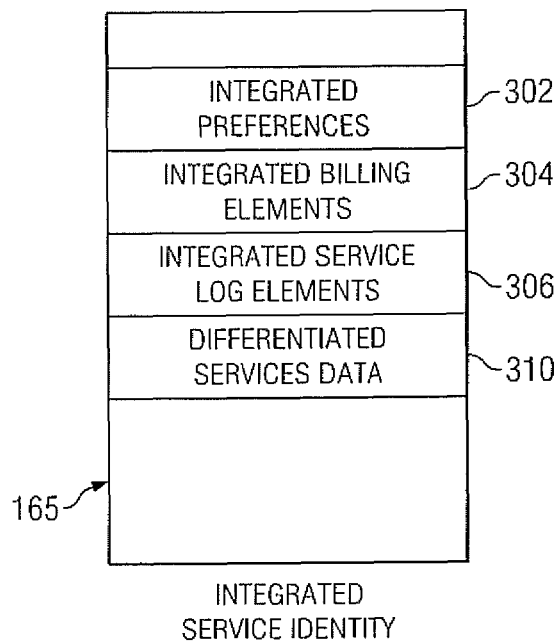
FIG. 3 is a block diagram of selected elements of an embodiment of a data processing system suitable for implementing aspects of an integrated service identity feature.

Referring now to FIG. 3, selected elements of an embodiment of an integrated service identity 165 are depicted. In the depicted embodiment, ISI 165 including integrated preferences elements 302, integrated billing elements 304, and integrated service logs elements 306. In addition, the depicted embodiment of ISI 165 includes differentiated services data 310. The integrated preferences, billing, and service log elements 302, 304, and 306 represent information that is applicable to and may be shared among all of the information exchange services provided to household 170. Differentiated services data 310, on the other hand, may include information that is specific to one or a limited number of the information exchange services.

Integrated preferences information 302 of ISI 165, as its name suggests, includes preferences or "favorites" settings that are applied to all of the information exchange services provided to household 170. Integrated preferences information 302 may include, for example, preference settings for preferred contact information, password settings, user profile information, parental control settings, calendar, scheduling, reminder settings, and so forth.

In some embodiments, integrated billing elements 304 encompasses billing information pertaining to all of the information exchange services provided to household 170. Integrated billing elements 304 might include, as examples, billing address information, credit card and/or bank account information, invoice scheduling information, invoice preferences information, e.g., invoice by email, invoice by paper mail, and so forth.

Integrated customer service logs elements 306 may include information relevant to all of the household's interaction with the service provider or providers of the information exchange services received by household 170. In some embodiments, integrated customer service logs elements 306 may include, as examples, customer services logs identifying and/or detailing customer service events pertaining to household 170 or any of the information exchange services. Integrated customer service logs elements 306 may enable provider network 101 to identify service problems, coordinate service activities, and otherwise improve service and/or reduce costs.

As depicted in FIG. 3, ISI 165 may further include an element identified as differentiated services data 310. Differentiated services information 310 may include service-specific identity information and/or links to service-specific data. For example, wireless telephony service 191 provided to household 170 may have settings, features, and other service identity parameters that are specific to wireless telephony technology and are not readily adaptable for use with integrated service preferences, billing, and/or customer service information.

In some embodiments, aspects of integrated service identities as disclosed herein are implemented in software, i.e., implemented as a set of computer executable instructions stored in a computer readable storage medium or stored in a set of two or more computer readable storage media including, as an example, the storage media 210 of FIG. 2. In these embodiments, the computer functionality embedded in the stored instructions may be described or illustrated with reference to flow diagrams illustrating the processes or methods that may occur when the applicable instructions are executed.

Figure 4:
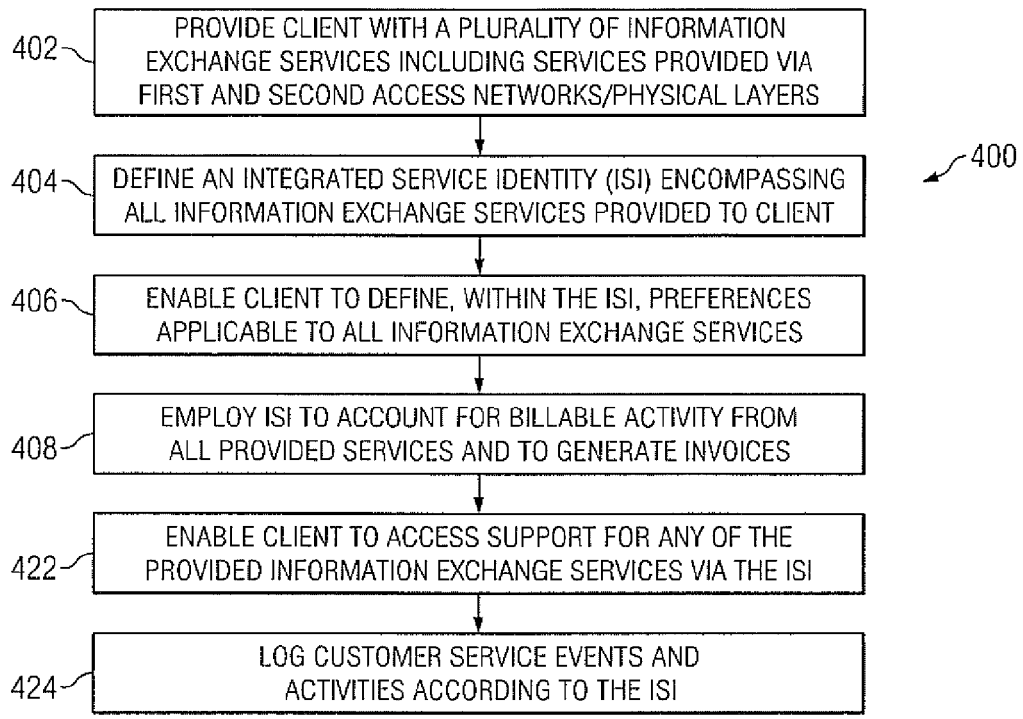
FIG. 4 is a flow diagram depicting selected elements of a process for providing an integrated service identity.

Referring now to FIG. 4, a flow diagram depicts selected elements of an embodiment of a process 400 for implementing an integrated service identity is depicted. In the depicted embodiment, process 400 as shown includes providing (block 402) a user with a plurality of information exchange services. The services provided to the user may include services provided through a first access network and/or physical network layer, e.g., a DSL layer, and other service(s) provided through a second access network and/or a second physical network layer e.g., a wireless access network such as UMTS, W-CDMA, and so forth.

An ISI is defined (block 404) for a set of two or more of the information exchange services provided to a household. Process 400 as depicted in FIG. 4 further includes enabling (block 406) the user to define within the ISI, preference information or settings applicable to two or more of the information exchange services. The ISI may be employed (block 408) to account for billable activity from all information exchange services provided to user and to generate monthly or periodic invoices to the user (block 408).

The depicted embodiment of method 400 may further include, enabling (block 422) the user to access support for any of the information exchange services provided to the household. Moreover, the ISI may enable the provider or providers of information exchange services to monitor a household's customer service history across all of the services and/or devices provided to the household. If, for example, a household is experiencing customer service issues on all services that are provided through a common set of devices or other hardware elements, the integrated service log may enable the service provider to recognize a commonality between customer service requests for differentiated services. Process 400 as depicted in FIG. 4 further includes logging (block 424) customer service event activities according to the ISI.

Figure 5:
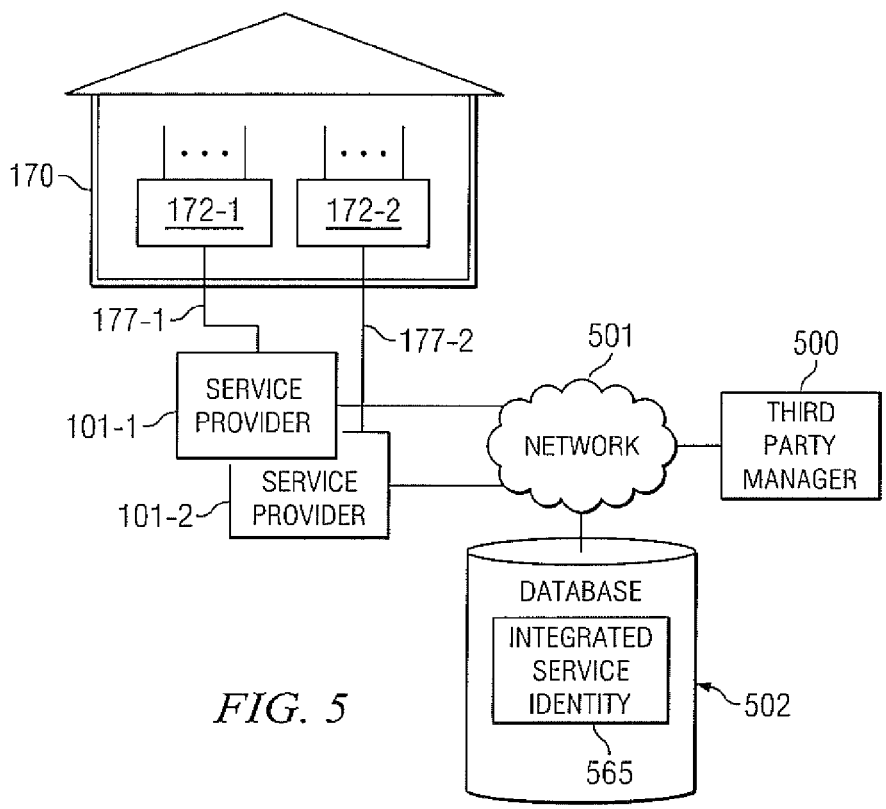
FIG. 5 is a block diagram of selected elements of an alternative embodiment for providing an integrated service identity.

Referring now to FIG. 5, a block diagram depicts an alternative embodiment for implementing an ISI 165. In the embodiment depicted in FIG. 5, household 170 receive a first set of information exchange services, represented by reference numeral 177-1, from a first provider network 101-1. Household 170 also receives a second set of one or more information exchange services 177-2 from a second provider network 101-2. In the depicted embodiment, the first set of information exchange services 177-1 are provided to household 170 via residential gateway 172-1 while the second set of information exchange services 177-2 are provided to household 170 via a second residential gateway 172-2. Although FIG. 5 depicts distinct residential gateways for the set of information exchange services provided by the different service providers, other embodiments may employ a common gateway, more than two gateways, and so forth.

As depicted in FIG. 5, a third party manager 500 is shown connected to a network 501. Service providers 101-1 and 101-2 are also connected to network 501. Network 501 may represent or include elements of a public network such as the Internet. In other embodiments, the network 501 may be a private network established by a virtual private network (VPN) or other form of private network operated by first provider network 101-1, second provider network 101-2, third party manager 500, or another network provider (not shown).

Also depicted in FIG. 5 is a database 502 operably connected to network 501 wherein the information stored in database 502 may be accessed from network 501. Depending upon the implementation, access to database 502 via network 501 may require password and/or additional form(s) of authentication. In the embodiment depicted in FIG. 5, database 502 includes an ISI 565 that is managed by third party manager 500. Third party manager 500 may provide first provider network 101-1 with access to a first portion of ISI 565 and access to a second portion of ISI 565 via second provider network 101-2. Third party manager 500 may also make ISI 565 available to household 170 so that household 170 can access and/or modify ISI 565. In this embodiment, third party manager 500 enables an integrated service identity despite the lack of a single provider of information exchange services.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A service provisioning method, comprising:
responsive to a first user input from a user receiving a plurality of information exchange services, the plurality of information exchange services including a first service provided via a first access network comprising a wireline physical layer and a second service provided via a second access network comprising a wireless physical layer, recording an integrated setting in an integrated service identity data structure, wherein the integrated setting defines a setting common to the first service and the second service and wherein the integrated setting comprises a parental control setting;
responsive to a second user input, recording a differentiated setting in the integrated service identity data structure, wherein the differentiated setting is applicable to the second service and inapplicable to the first service;
accessing the integrated service identity data structure to:
process billable activity associated with the first service and the second service; and
issue an integrated statement encompassing the first service and the second service; and
accessing integrated customer service log information in the integrated service identity data structure, wherein the customer service log information is indicative of a household's interactions with a service provider via the first service and the second service.

2. The method of claim 1, wherein the plurality of information exchange services include multimedia content delivery services, fixed access voice services, and broadband Internet services provided via the first access network.

3. The method of claim 2, wherein the wireline physical layer is compliant with a standard selected from: digital subscriber line, integrated services digital network, T-carrier, and E-carrier.

4. The method of claim 1, wherein the plurality of information exchange services include a mobile telephony service provided via the second access network.

5. The method of claim 4, wherein the wireless physical layer is compliant with a standard selected from: wideband-code division multiple access, time division-wideband-code division multiple access, time division-synchronous-wideband-code division multiple access, and time division multiple access.

6. The method of claim 1, further comprising:
defining a single logon for all user devices accessing any of the information exchange services.

7. The method of claim 6, wherein the user devices include a set top box, an Internet protocol phone, and a computer.

8. A computer readable memory including stored processor executable program instructions that, when executed by a processor, cause the processor to perform operations comprising:
responding to a first user input from a user receiving a plurality of information exchange services, the plurality of information exchange services including a first service, provided by a first service provider via a first access network comprising a wireline physical layer, and a second service, provided by a second service provider via a second access network comprising a wireless physical layer, by recording an integrated setting in an integrated service identity data structure, wherein the integrated setting defines a setting common to the first service and the second service and wherein the integrated setting comprises a parental control setting;
responding to a second user input by recording a differentiated setting in the integrated service identity data structure, wherein the differentiated setting is applicable to the support service and inapplicable to the first service; and
accessing the integrated service identity data structure to perform:
processing billable activity associated with the first service and the second service;
issuing an integrated statement encompassing the first service and the second service; and
accessing integrated customer service log information in the integrated service identity data structure, wherein the customer service log information is indicative of a household's interactions with a service provider via the first service and the second service.

9. The computer readable memory of claim 8, wherein the plurality of information exchange services include multimedia content delivery services, fixed access voice services, and broadband Internet services provided via the first service provider.

10. The computer readable memory of claim 9, wherein the plurality of information exchange services include mobile telephony services provided via the second service provider.

11. The computer readable memory of claim 8, wherein the operations include: defining a single logon for all user devices rendering any of the plurality of information exchange services.

12. The computer readable memory of claim 11, wherein the user devices include a set top box associated with multimedia content delivery services, an Internet protocol phone for fixed access voice services, and a computer for broadband Internet services.

13. A system, comprising:
a processor;
a computer readable medium, accessible to the processor, including processor executable program instructions that, when executed by the processor, cause the processor to perform operations comprising:
responding to a first user input from a user receiving a plurality of information exchange services, the plurality of information exchange services including a first service provided by a first service provider via a first access network comprising a wireline physical layer and a second service provided by a second service provider via a second access network comprising a wireless physical layer by recording an integrated setting in an integrated service identity data structure, wherein the integrated setting defines a setting common to the first service and the second service and wherein the integrated setting comprises a parental control setting;
responding to a second user input by recording a differentiated in the integrated service identity data structure, wherein the differentiated is applicable to the second service and inapplicable to the first service; and
accessing the integrated service identity data structure to perform:
processing billable activity associated with the first service and the second service;
issuing an integrated statement encompassing the first service and the second service; and
accessing integrated customer service log information in the integrated service identity data structure, wherein the customer service log information is indicative of a household's interactions with a service provider via the first service and the second service.

14. The system of claim 13, wherein the plurality of information exchange services includes multimedia content delivery services, fixed access voice services, and broadband Internet services provided via the first access network.

15. The system of claim 13, wherein the first physical layer a physical layer selected from: a digital subscriber line physical layer, an integrated services digital network physical layer, a T-carrier physical layer, and an E-carrier physical layer.

16. The system of claim 13, wherein the plurality of information exchange services includes a mobile telephony service provided via the second access network.

17. The system of claim 16, wherein the second physical layer is selected from a physical layer selected from: a wideband-code division multiple access physical layer, a time division-wideband-code division multiple access physical layer, a time division-synchronous-wideband-code division multiple access physical layer, and a time division multiple access physical layer.

18. The system of claim 13, wherein the operations include:
enabling the user to define a single logon for all user devices rendering any of the plurality of information exchange services.

19. The system of claim 18, wherein the user devices include:
a set top box to access multimedia content delivery services;
an Internet protocol phone to access fixed access voice services; and
a computer to access broadband Internet services.

* * * * *